United States Patent [19]

Bredow et al.

[11] 3,971,281
[45] July 27, 1976

[54] ANGLE SHEARS WITH DIVIDED SHEAR CUTTING MEMBERS

[76] Inventors: Walter Bredow, Ziegelmasch 16a; Walter Tamaschke, Pestalozzistr. 10, both of 322 Alfeld, Leine; Günther Rott, Neue Strasse 35, 3221 Gerzen near Alfeld, all of Germany

[22] Filed: Feb. 11, 1975

[21] Appl. No.: 549,055

[30] Foreign Application Priority Data

Sept. 5, 1974 Germany............................ 2442547

[52] U.S. Cl. .................................. 83/519; 83/622; 83/631; 83/636; 83/641; 83/700
[51] Int. Cl.² ........................................ B23D 15/08
[58] Field of Search ............ 83/513, 519, 622, 631, 83/636, 641, 700

[56] References Cited

UNITED STATES PATENTS

| | | | |
|---|---|---|---|
| 1,446,460 | 2/1923 | Hermani | 83/519 X |
| 1,876,902 | 9/1932 | Forbes | 83/519 X |
| 2,047,322 | 7/1936 | Hazelton | 83/631 X |
| 3,174,375 | 3/1965 | Westra | 83/631 X |
| 3,308,702 | 3/1967 | Klein | 83/622 X |
| 3,528,332 | 9/1970 | Thumim et al. | 83/519 X |
| 3,568,557 | 3/1971 | Hanni | 83/519 |

*Primary Examiner*—Frank T. Yost
*Attorney, Agent, or Firm*—Holman & Stern

[57] ABSTRACT

An angle shears with two shear cutting members for cuts in two directions. The two shear cutting members are arranged to be moved independently of each other and have a divided drive. The cutting edges of the shear cutting members are arranged at small angles to the surface of the sheet metal to be cut.

15 Claims, 14 Drawing Figures

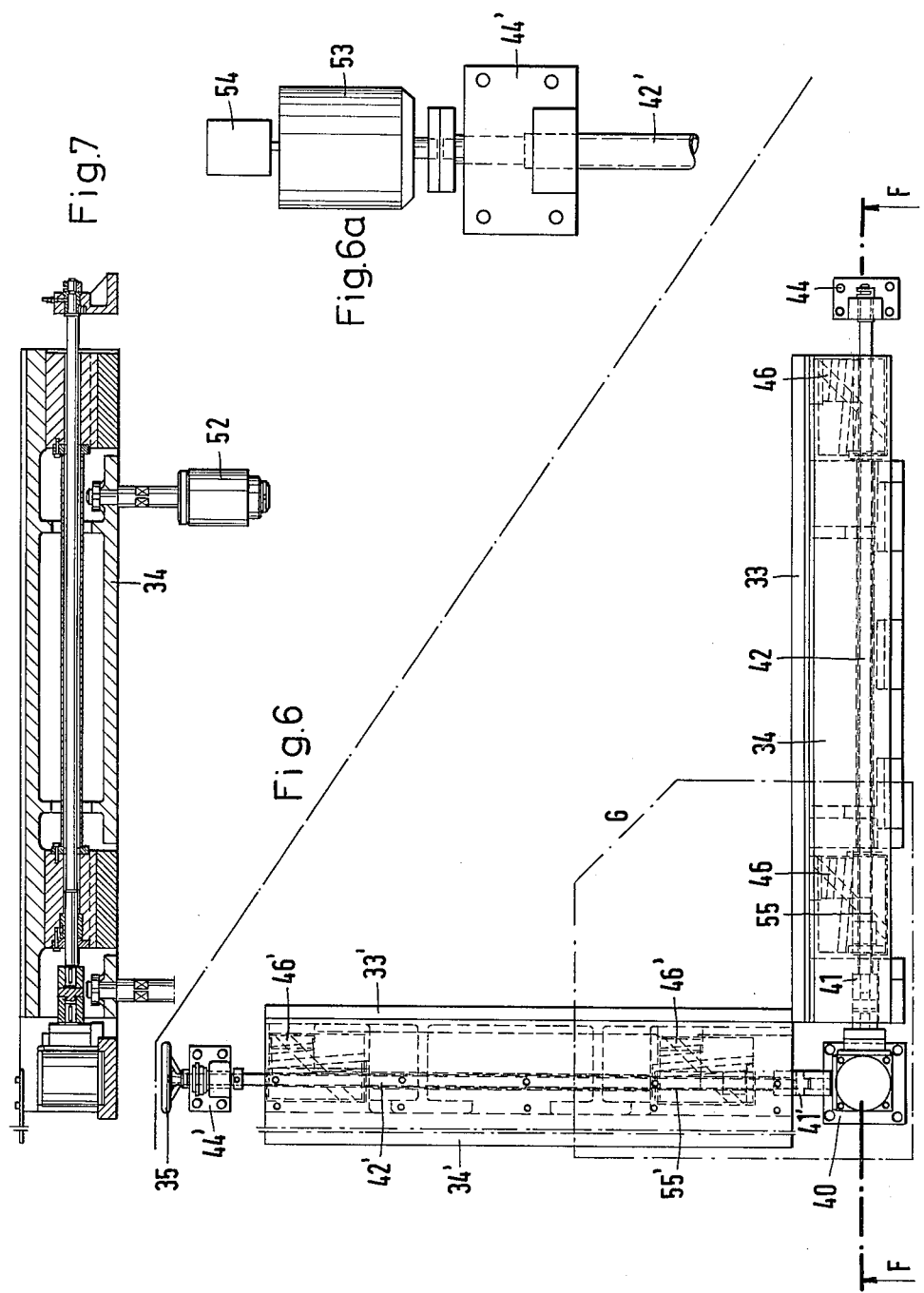

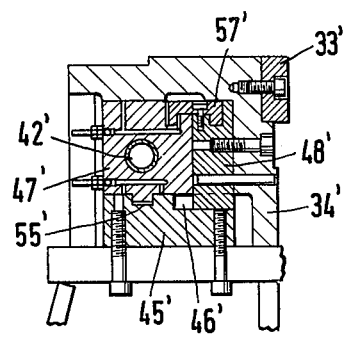
Fig.9
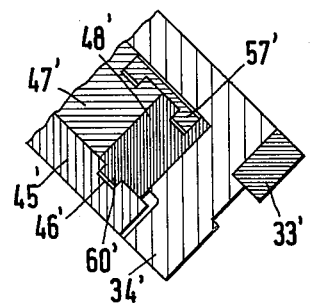
Fig.8b
Fig.8
Fig.8a
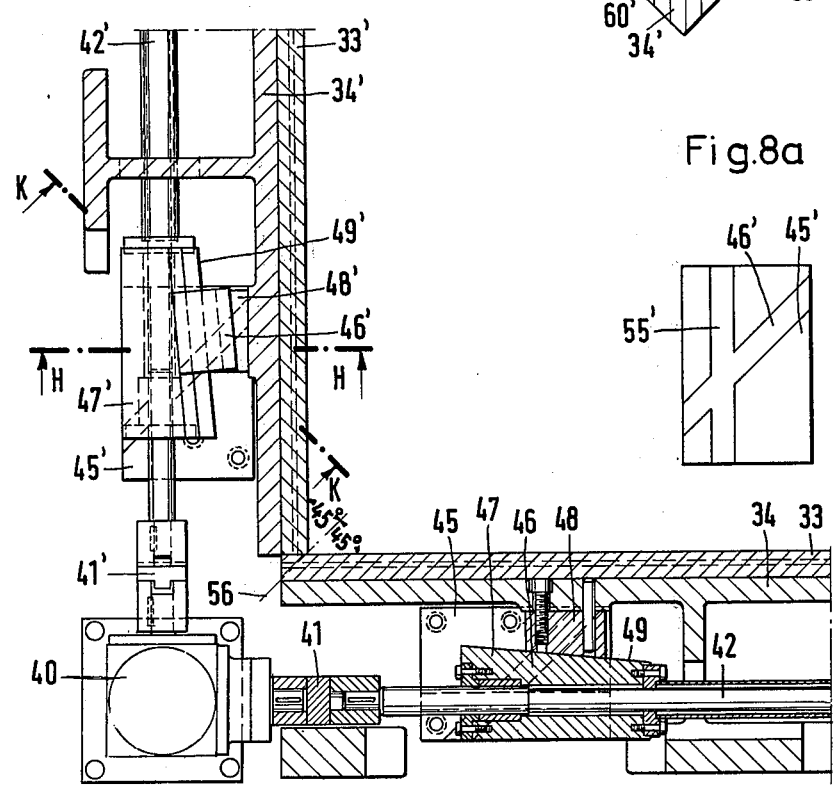

Automation by Numerical Control

ANGLE SHEARS WITH DIVIDED SHEAR CUTTING MEMBERS

FIELD OF THE INVENTION

The invention relates to an angle shears with two shear cutting members for cuts in two directions.

BACKGROUND OF THE INVENTION

The prior art

For cutting up sheets of metal, impact shears with one straight shear cutting member exist. Since a large number of constructions require rectangular pieces of cut sheet metal, shears have also been proposed with two shear cutting members which are connected rigidly with each other and are perpendiculaar to each other. With such shears, it is admittedly possible to achieve a greater working efficiency than with shears having only a single shear cutting member. With angle shears with shear cutting members connected rigidly with each other, there is, however, the disadvantage that it is not readily possible to cut along lengths in one co-ordinate, which exceed the length of the shear cutting member used. In the case of rigid angle shears, it is admittedly possible to carry out linear cuts in one direction, but, however, the cutting operation in the other direction is hindered.

SUMMARY OF THE INVENTION

One object of the invention is that of developing an angle shears in order to avoid hinderance in the case of cutting in only one or the other direction, to increase the angular accuracy between the two cut edges and to provide a proper basis for the length of cut being independent of the length of the shear cutting member.

In accordance with the invention, there is the provision that the one shear cutting member in the X-direction and the other shear cutting member in the Y-direction are arranged so as to be capable of moving independently of each other, that they have a divided or, respectively, independent drive and in that the cutting edges of the shear cutting members are inclined at small angles to the surface of the sheet metal to be cut.

These features are connected with a novel manner of operating the machine. In the case of cutting in several steps, the shear cutting member is not operated with the full stroke so that the sheet metal at the end of the cutting edge is not dented and therefore made useless. Instead, the shear cutting member is stopped at a suitable, adjustable position of the downward stroke and moved upwards again. After the follow up movement of the sheet metal in the direction of cutting, the cut is then extended by a renewed downward stroke. In the case of this manner of operation of the shear cutting members, it is not possible to drive the members by the means of continuously rotating eccentrics, since in this case, the cutting members would be moved for the whole extent of a stroke and accordingly the above mentioned denting of the sheet metal would occur.

As regards the setting at an angle of the cutting edges with respect to the surface of the piece of sheet metal, there are the possibilities either of beginning the cut at the point of meeting of the X and Y shear cutting members, that is to say, selecting at this position the lowest point of the shear members, and then cutting in a direction away from this point outwardly, or the X Y point of intersection or point of meeting can be displaced upwards and the cut is then begun, at a point away from this point of meeting. In both cases, the precise lowering or downward movement of the shear cutting members at the X Y point of intersection is extremely important, since even small departures or inaccuracies with respect to the plunging of the shear cutting members at the X Y point of intersection will lead to deformations of the sheet metal to be cut and, therefore, to a reduction in quality.

In order to fulfill the above mentioned conditions, the shear cutting members are not actuated with conventional eccentrics and instead, in accordance with the invention, are operated by means of threaded spindles, which are driven in one direction for lowering and are driven in the opposite direction for raising. In this respect, the rotational position of the respective threaded spindle is employed for determining the position of the shear cutting member. This type of determination of position is convenient, because owing to the transmission ratio represented by the spindle lead in determining the stroke displacement, it is possible to achieve a higher resolution, which can be evaluated by indirect position measurement. In the case of this type of indirect position measurement, furthermore those measurement errors no longer occur, which result in the case of direct positional measurement in the case of which the displacement sensor is arranged on the machine housing or frame on loading off the shear cutting due to elastic deformation of the machine housing.

In accordance with the invention, the threaded spindles are arranged to co-operate with ball train nuts. The latter ensure a high degree of accuracy of transmission owing to their small backlash. Furthermore, the friction between the spindle and the ball train nut is extraordinarily small, something which is advantageous as regards avoidance of an additional torsion moment which would falsify the result of measurement. The torsion moments due to the loading of the shear cutting members in the case of this form of indirect measurement, in the case of which the measuring spindle is constituted by the drive spindle, do not come into consideration, since these moments are equal in the case of the same angular setting of the X and Y shear cutting members and in the case of the same lead of the spindle and the same spindle diameter. The absolute positional differences resulting from the angular errors do not come to be of any importance in the cut resulting, since in this respect, it is only the relative position of the X and Y shear cutting members in relation to each other which are of significance.

In accordance with the invention, the cutting gap can be changed by changing or adjusting the position of the lower knives. This adjustment in accordance with the thickness of the sheet metal and the quality of the sheet metal has a considerable significance as regards cut quality. The threaded spindles provided for adjusting the lower knives in accordance with the invention are also arranged to be moved by ball train nuts.

In accordance with the invention, the threaded spindles for the lower knives in the X-direction and the the threaded spindles for the lower knives in the Y-direction are connected by means of an angular transmission. In order to produce a high degree of agreement in the cutting gaps in the case of knives in the X and Y direction, an arrangement of spindles with the same lead is provided, which adjust the lower knives with the help of wedge arrangements having the same slope. In order to avoid a gap at the point of meeting of the lower knives in the X and Y direction, the lower knives are guided in guide means arranged at 45° to the X and Y directions.

In accordance with the invention, the drive for the lower knives is constructed as a manual or a motor drive, and the length measurement for the two lower knives in the X and Y directions can be carried out by means of a lower knife threaded spindle.

In accordance with the invention, the position of the shear cutting members in the X and Y directions is respectively determined by a positional sensor, which is coupled mechanically with the respective ball train spindle. As positional sensors, it is possible to use in this respect, single or multi-rotation potentiometers, in the case of which the wiper position of the potentiometers represents the respective positional actual value. It is also possible to use as positional sensors absolutely digital positional sensors, in the case of which the respective positional actual vaue can be represented by a digital signal. Finally, as positional sensors, it is also possible to employ photo-electric or electro-magnetic pulse sensors, in the case of which the respective position can be represented by the forward and backward counting of pulses. Furthermore it is also possible to use synchro or selsyn systems as positional sensors.

In accordance with the invention for regulating the position of the shear cutting members, it is possible to make use of the actual positional values represented by the positional sensors on the shear cutting member in the X and Y directions, and pre-established positional target value. For stabilizing the regulating circuit for the shear cutting member drive, it is possible to use a voltage proportional to the speed of rotation of the spindle. The voltage produced for stabilization of the regulating circuit can be produced by a tachogenerator. Finally, the respective positional target values of the shear cutting members in the X and Y directions can be represented by a program in combination with a numerical control system for the angle shears.

The angular accuracy of two cutting edges arranged perpendicular to each other is larger in the case of an angle shears, which is constructed in accordance with the invention, than in the case with a shears having a single cutting member, in the case of which the second cut perpendicular to the first cut must be produced by moving around the piece of sheet metal using an abutment, in a second cutting operation. As a result of this, owing to dispensing with cumulative angular errors, there is the possibility of cutting up a piece of sheet metal even in the case of a large number of cuts in a gap-free manner without having to make cuts specially for angular corrections. The arrangement in accordance with the invention makes it possible, in the case of much multiple cutting up operations, to cut out parts from the piece of sheet metal, whose one edge is longer than the associated shear cutting member.

Angle shears, with the construction is accordance with the invention, can be automated by numerical in systems in a highly satisfactory manner. While previously the automation of such shears was limited to NC-controlled positioning of the co-ordinate table, with the arrangement in accordance with the invention, there is the simple possibility of automating the drive of the shear cutting members and also, by positioning of the lower knives, the width of the cutting gap with the help of a NC-control system. In conjunction with the additional automatic control of the gripping jaws, it is thus possible to achieve with the arrangement in accordance with the invention, a degree of automation which has not previously been attained in the case of a cutting operation with its principal and auxiliary functions.

BRIEF DESCRIPTION OF THE DRAWINGS

In what follows, the invention will be described in detail with respect to the accompanying drawings.

FIG. 6 shows the arrangement of the lower knives in conjunction with screw threaded spindles, wedged and angular transmissions.

FIG. 6a is a fragmentary view in elevation of a power drive for adjustment of the lower knife.

FIG. 7 shows a section through the lower knife setting means along the line F—F in FIG. 6.

FIG. 8 shows an enlarged view of parts in the part G of FIG. 6.

FIG. 8a shows the guide plate in plan view.

FIG. 8b shows a part section along the line K—K in FIG. 8.

FIG. 9 shows a section through the lower knife setting means along the section line H—H in FIG. 8.

DESCRIPTION OF PREFERRED EMBODIMENTS

Figure 1:
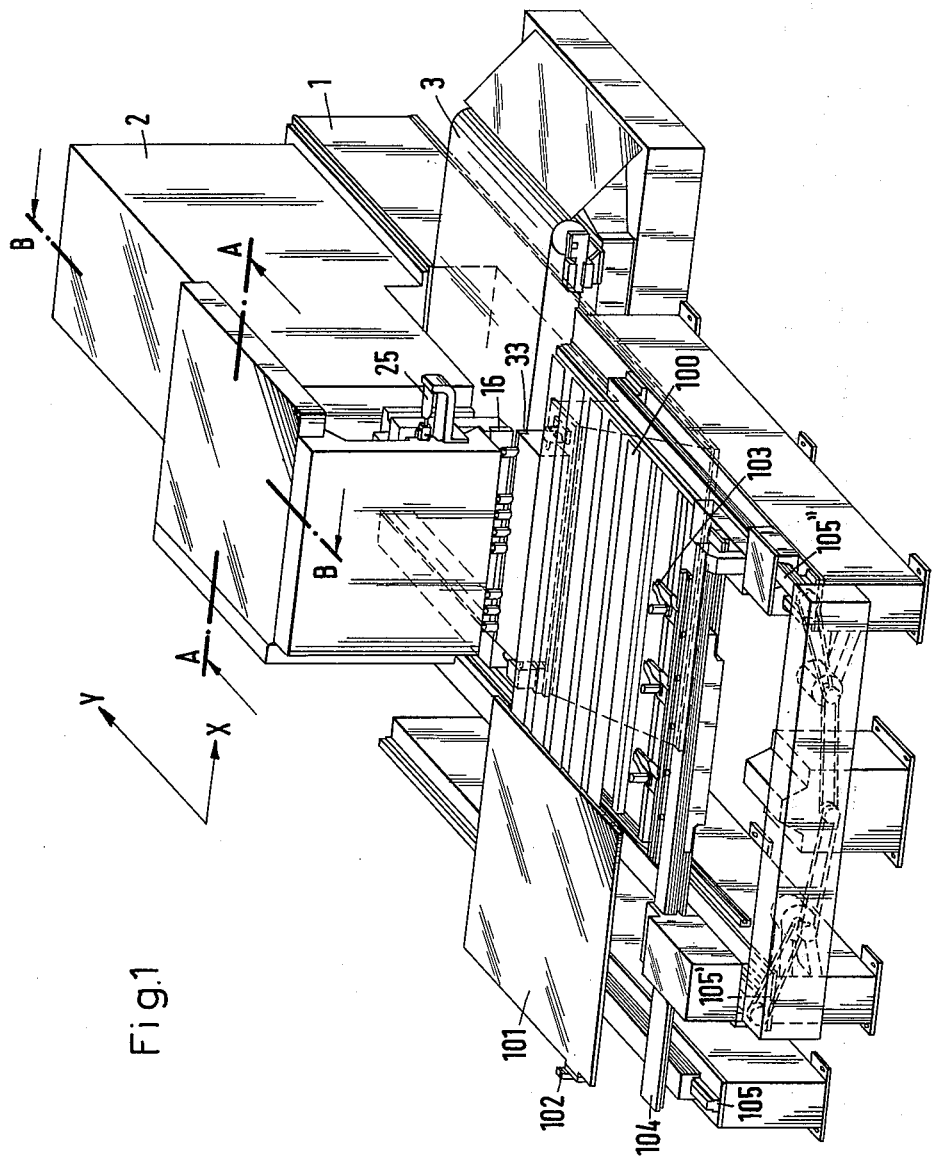
FIG. 1 shows in perspective a general view of a machine embodying the invention.

For clarification it should be noted that reference numerals which relate to the X-direction and those related to the Y-direction are distinguished from each other by primes applied to the numerals in the Y-direction.

FIG. 1 shows in perspective a general view of the machine. Reference numeral 1 denotes the lower frame of the machine and reference numeral 2 denotes the upper part of the machine. The co-ordinate table 100, which may be provided with numerical control, serves for positioning the pieces of sheet metal to be cut with the angle shears. Reference numeral 101 denotes the support table for the pieces of sheet metal and reference numeral 102 denotes the abutment in the X-direction. Reference numeral 103 denotes a holding dog for holding the pieces of sheet metal on the co-ordinate table; the holding dogs can be actuated pneumatically or hydraulically. The guide rails 104 and 105 serve for guiding the co-ordinate table 100 in the X and Y directions. Reference numeral 16 indicates the shear cutting member in the X co-ordinate direction above the X-lower knife 33. The cylinder 25 serves for actuating the sheet metal holding down rail. The conveyor belt 3 serves for removing pieces of cut out sheet metal and waste strips.

Figure 2:
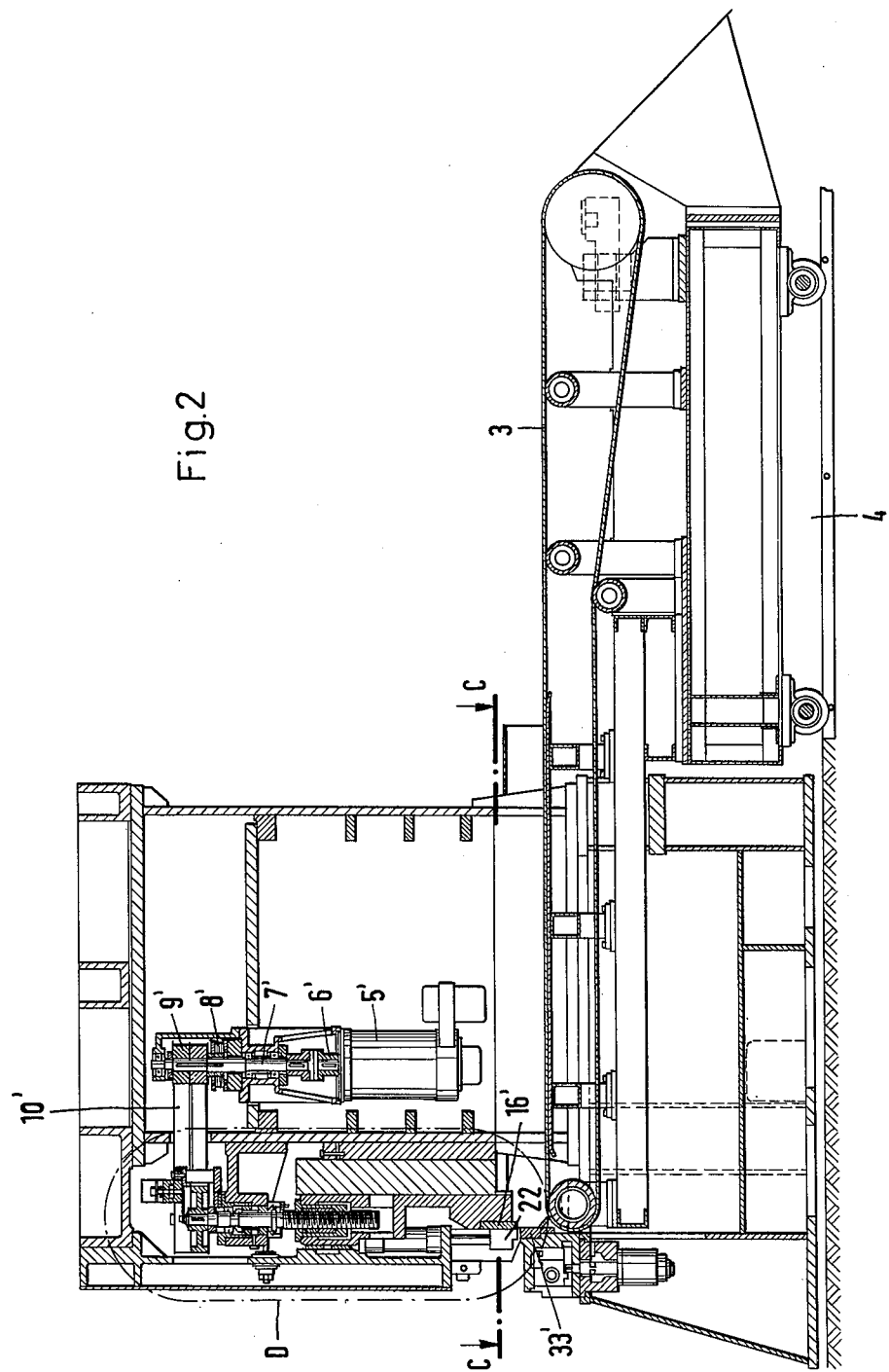
FIG. 2 shows a vertical section generally along the line A—A of FIG. 1 through the machine, which comprises the arrangement of the principal parts such as the shear cutting members, the shear cutting member drive, the lower knives and the conveyor belt for the removal of the cut out pieces of sheet metal, in the case of which numbers provided with an index stroke relate to the arrangement in the Y-direction.

FIG. 2 shows the arrangement of the principal parts of the machine with reference to a cross-section along the line A—A in FIG. 1. The conveyor belt 3 for removal of the cut pieces of sheet metal and waste strips is arranged on a travelling lower frame 4, which serves for a more ready removal of the conveyor belt from the shears and increases ease of access to the machine when the knives are changed. The motor drive 5' serves for moving the shear cutting member 16', in this case in the Y-direction. The sheet metal holding down device 22 serves for holding the piece of sheet metal. Reference numeral 6' denotes the shaft coupling, reference numeral 7' denotes the drive shaft, reference numeral 8' denotes an electro-magnetic brake, reference numeral 9' denotes a gear wheel, while reference numeral 33' denotes the lower knife in the Y-direction.

Figure 3:
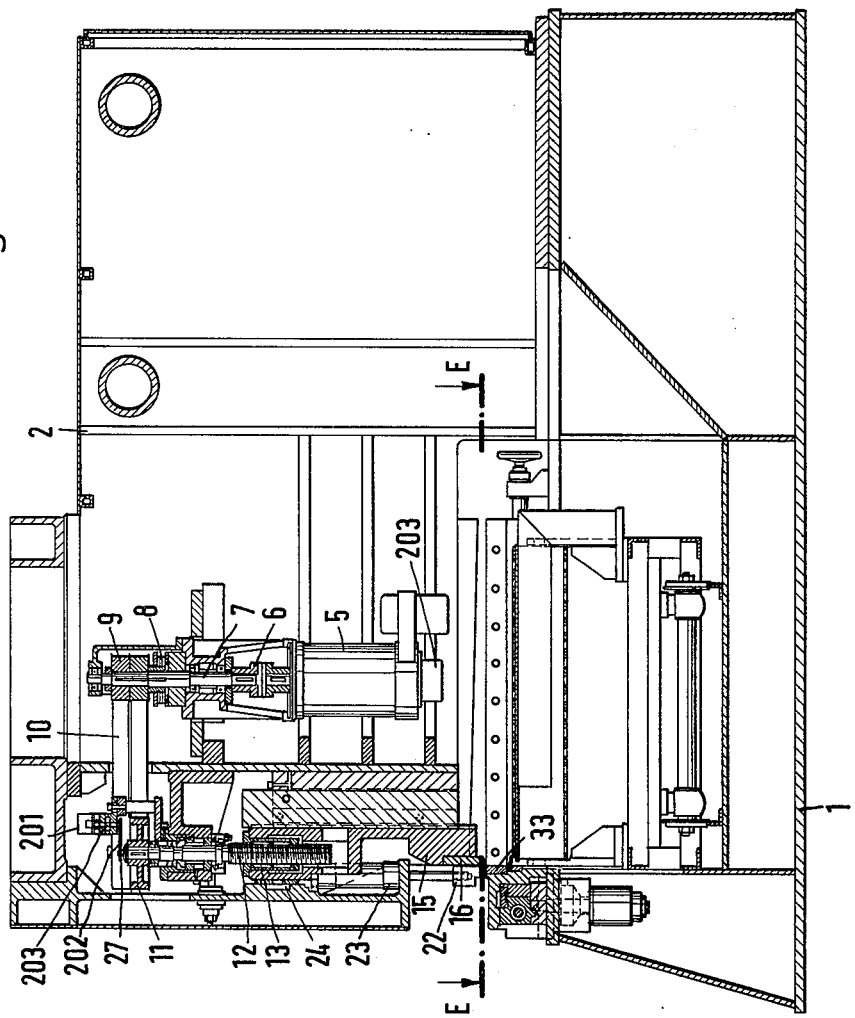
FIG. 3 shows a vertical section generally along the line B—B of FIG. 1 through the machine which more particularly serves for making clear the drive of one shear cutting member, in the case of which individual parts without index strokes relate to the arrangement in the X-direction.

FIG. 3 shows a vertical section through the machine along the line B—B in FIG. 1. In this case, reference numeral 5 denotes an electric motor which, via a shaft coupling 6 and the driving shaft 7, drives the gear wheel 9. Placed between these parts, there is the electro-magnetic brake 8, which holds the shear cutting member in its highest position when the motor 5 is switched off. Via a toothed belt 10, the threaded spindle drive wheel 11 is driven, which with the help of the ball train threaded spindle 12, displaces the ball train nut 13 in the vertical direction. This ball train nut is firmly connected with the shear cutting member carrier 15, on which, in turn, the shear cutting member 16 is arranged. The sheet metal holding down device 22 is actuated by the holding down cylinder 23; the latter rests on the support rail 24. As a drive motor 5 preferably use is made of a D.C. motor, since owing to its electrical properties, such a motor can more readily be incorporated in the necessary position in a regulating circuit. For determining the position of the shear cutting member, use is made of the positional sensor 201, which is connected in a backlash-free manner with the ball train threaded spindle 12. The positional sensor can both be directly coupled with the shaft as well as being driven via a toothed belt 202 by the ball train threaded spindle, as indicated in FIGS. 3 and 5.

Figure 4:
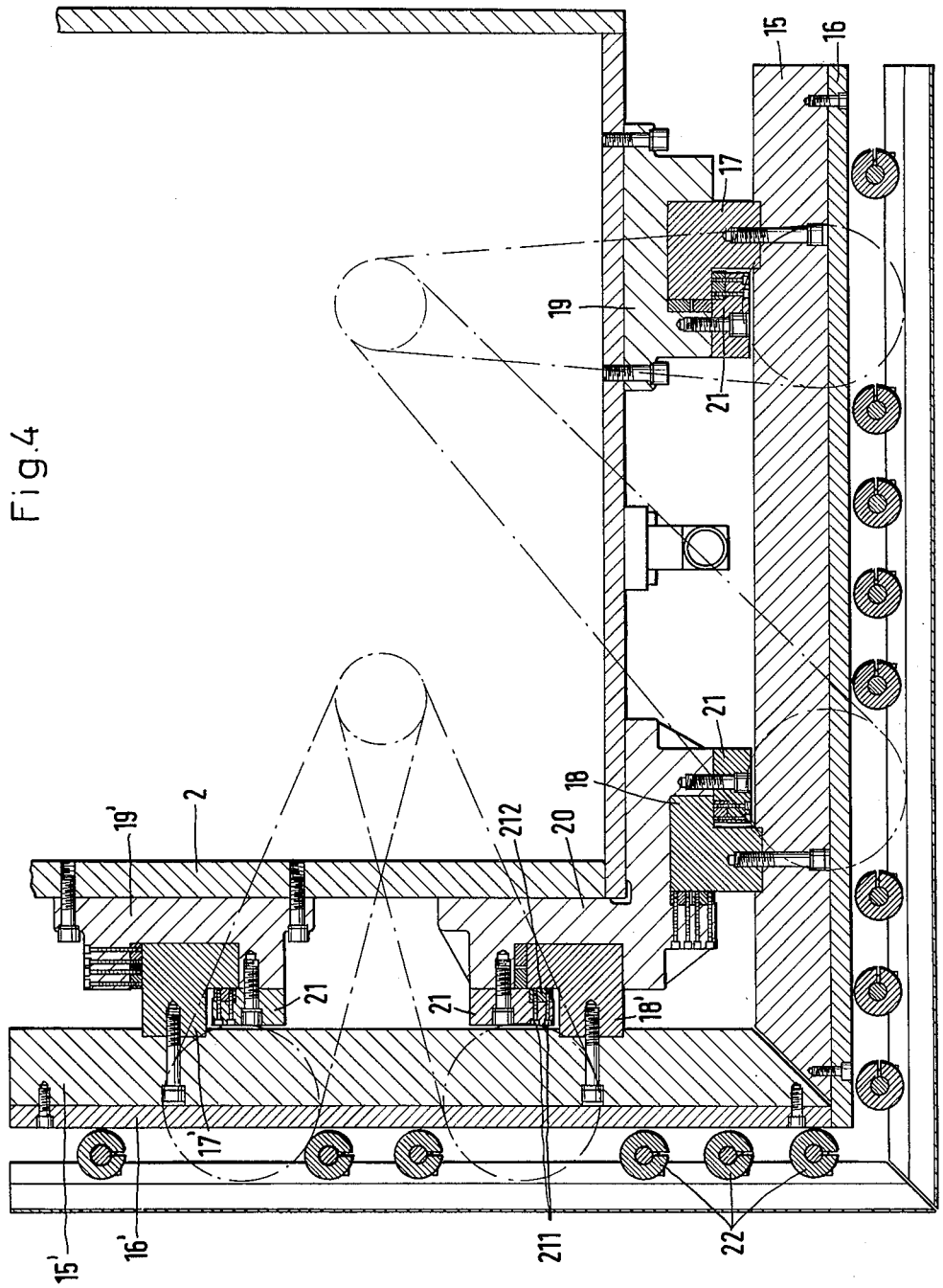
FIG. 4 shows a horizontal section through the shear cutting member arrangement along the line C—C of FIG. 2.

FIG. 4 shows a horizontal section through the shear cutting member arrangement along the line C—C in FIG. 2. In this case, the shear cutting members in the X-direction and the Y-direction are held by the shear cutting member carriers in the X-direction and the Y-direction. The shear cutting member carriers 15 and 15' respectively are firmly connected by screw means with outer guide rails 17 and 17' and inner guide rails 18 and 18'. The movement of the shear cutting members is ensured perpendicular to the plane of the drawing along the outer guides 19 and 19' and at the meeting point of X and Y shear cutting members, use being made of a common guide 20. For the satisfactory movement without backlash of the shear cutting member guide rails, use is made of the covering rails 21 with the pressing screws 211 and the pressing piece 212. The sheet metal holding down devices 22 are arranged outside the shear cutting members.

Figure 5:
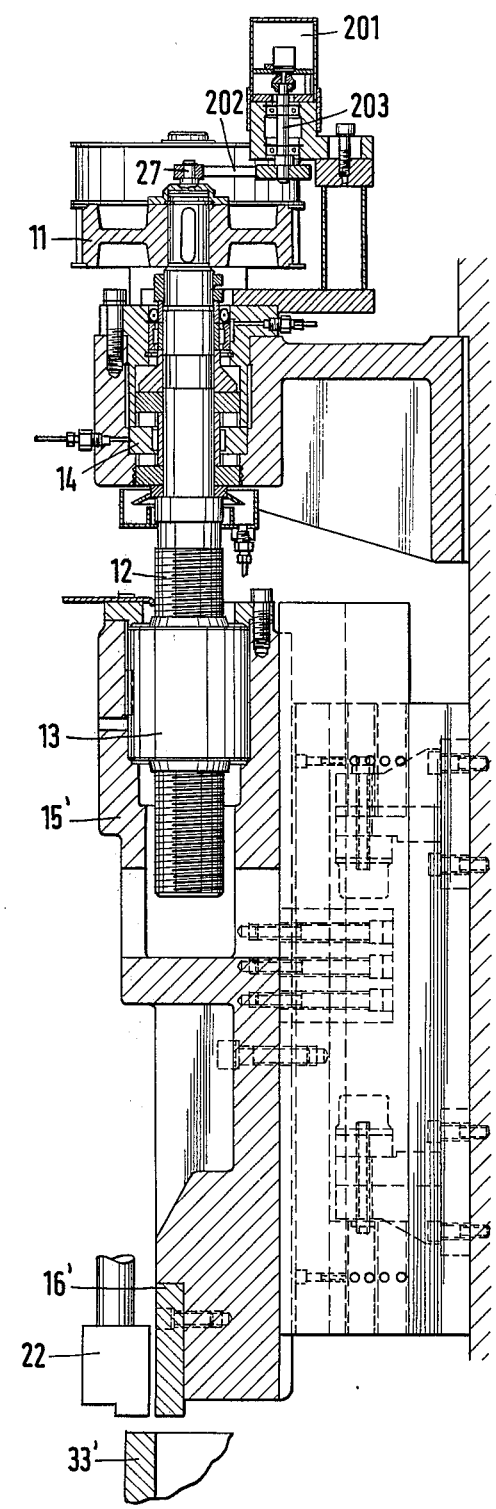
FIG. 5 shows an enlarged detail representation of a portion of FIG. 3 showing the shear cutting member drive.

FIG. 5 shows the shear cutting member drive on a larger scale in detail, in the case of which the reference numerals have the same significance as in FIG. 2. Additionally, the special rolling element bearing 14 is shown for the ball train threaded spindle. The type of positional sensor 201 is determined by the regulating system used and the standards to be expected as regards accuracy and dynamic characteristics of the regulating system, though requirements as regards resistance to wear also come into consideration. In the case of moderate requirements as regards resolution and drift, it is, for example, possible to use single turn or multi turn potentiometers as positional indicators, in the case of which the wiper setting of the respective potentiometer is a measurement of the respective positional actual value. The D.C. supplied by the wiper is generally compared with a target D.C. voltage and the resulting difference is supplied to a regulator, which influences the drive motor 5 accordingly.

Another possibility is represented by the use of synchro or selsyn systems, in the case of which the phase of the output A.C voltage is a measurement of the angular position. The phase position is compared with a target phase position; from this, the regulating signal is derived. In this respect, conventional means are used for detecting multiple rotations.

In the case of higher standards as regards resolution and, respectively, drift, it is possible to use photo-electric or electro-magnetic pulse sensors as positional sensors, in the case of which, the respective position is determined by forward and backward counting of pulses. These pulses are generally supplied to a counting circuit and compared with a target value number. From the difference, it is possible to derive the necessary regulating signal. Finally, it is, however, absolutely possible to use completely digital positional sensors, in the case of which, the respective positional actual value is represented by a digital signal. This signal is generally compared with another absolutely digital signal and the difference resulting is supplied after digital/analog conversion to the regulator.

The tachogenerator 203 (FIG. 3) serves for producing a voltage dependent on the speed of rotation, which is required for the stabilization of the regulating circuit for the spindle drive motor 5.

FIGS. 6, 7 and 8 show the overall arrangement and details of the lower knives with the associated adjusting means. Reference numerals used more than once have uniform meanings in this respect. While FIG. 6 shows the overall arrangement in a plan view, FIG. 8 shows the part G with the surrounding line in FIG. 6 on a larger scale. FIG. 7 shows a side view along the section F—F in FIG. 6. In order to improve clarity the explanation is carried out with respect to FIG. 8. FIG. 8 shows the lower knives 33 and 33' for X and Y respectively, which are carried by the lower knife carriers 34 and 34' for X and Y respectively. The guide plate 45' represented in FIG. 8a and 8b has two guide grooves. The guide groove 55' runs parallel to the Y lower knife 33' and serves for guiding the wedged nut carrier 47'. The guide groove 46' runs at an angle of 45° to the guide nut 55' and ensures that, on displacement of the wedged nut carrier 47' by turning of the ball train threaded spindle 42', the wedged guide shoe 48', which is attached to the knife carrier 34', can only be displaced in the direction of the groove 46'. (For the lower knife X the corresponding parts are arranged in a mirror-reversed manner). At the free ends (see FIG. 6), the ball train spindles 42 and 42' for X and Y respectively are guided in the bearing blocks 44 and 44' for X and Y respectively. The ball train threaded spindle arrangements which are the same for the co-ordinates X and Y, are connected via, couplings 41 and 41', with the angular transmission 40, which serves in a manner as free of backlash as possible for the accurate transmission of the angle of turning of the threaded spindle 42 and 42'. This ensures that the degree of adjustment for the X lower knife 33 and the Y lower knife 33' is always the same in each case. Accordingly, the above mentioned requirements as regards cut quality are fulfilled. For adjusting the lower knives, it is possible to make use of a common drive, which can be a simple hand drive 35, though it is also possible to use a power drive 53 for the adjustment of the lower knife (FIG. 6a). This power drive 53 can be an electric, pneumatic or hydraulic drive. The power drive 53 is conveniently coupled with the provisional measuring system 54 for the adjustment of the lower knives. In this manner, it is possible to automate the lower knife adjustment and, therefore, the adjustment of the cutting gap.

As remarked above, a satisfactory cut in the material necessitates a coming together or meeting without any gap of the X and Y lower knives 33 and 33' independently of the respective width of the cutting gap. This is achieved by the guide grooves 46, shown in broken lines, for the X lower knife 46' and the Y lower knife in the guide plate 45 and 45' in FIGS. 6, 8, 8a and 8b, which are arranged at angles of respectively 45° with respect to the direction of cut X and Y, into which the guide projections 60 and 60' on the wedged guide pieces 48 and 48' respectively fit. This arrangement at 45° of the guide grooves brings about in combination with the accurate angular transmission of rotation of the two ball train threaded spindles with the same lead a movement of the point of meeting of the X and Y lower knives 33 and 33' along the 45° line 56 denoted in broken lines and thus always ensure that there is no gap at the point of meeting when the cutting gap is adjusted.

FIG. 7 shows additionally the hydraulic gripping device 52 with whose help the lower knives are fixed in position after their positions have been adjusted.

FIG. 9 shows a section through the lower knife adjustment means along the line H—H in FIG. 8. In this case, in section, the Y ball train threaded spindle 42' can be seen, whose ball train spindle nut is embedded in the wedge-shaped nut carrier 47', which for its part is guided on the lower side of the guide groove 55', running parallel to the ball train spindle 42', of the guide plate 45'. The wedge-shaped guide piece 48' (see FIG. 8 and 8b) is connected in a fixed manner with the lower knife carrier 34' and lies on the oblique plane 49' (see FIG. 8) of the wedge-shaped nut carrier 47'. By means of a clamp 57', the wedge-shaped nut carrier 47' is moved along the wedge-shaped guide piece 48' on movement owing to rotation of the ball train spindle 42' (for reference numerals 33' and 46' see FIGS. 8, 8a, 8b).

Figure 10:
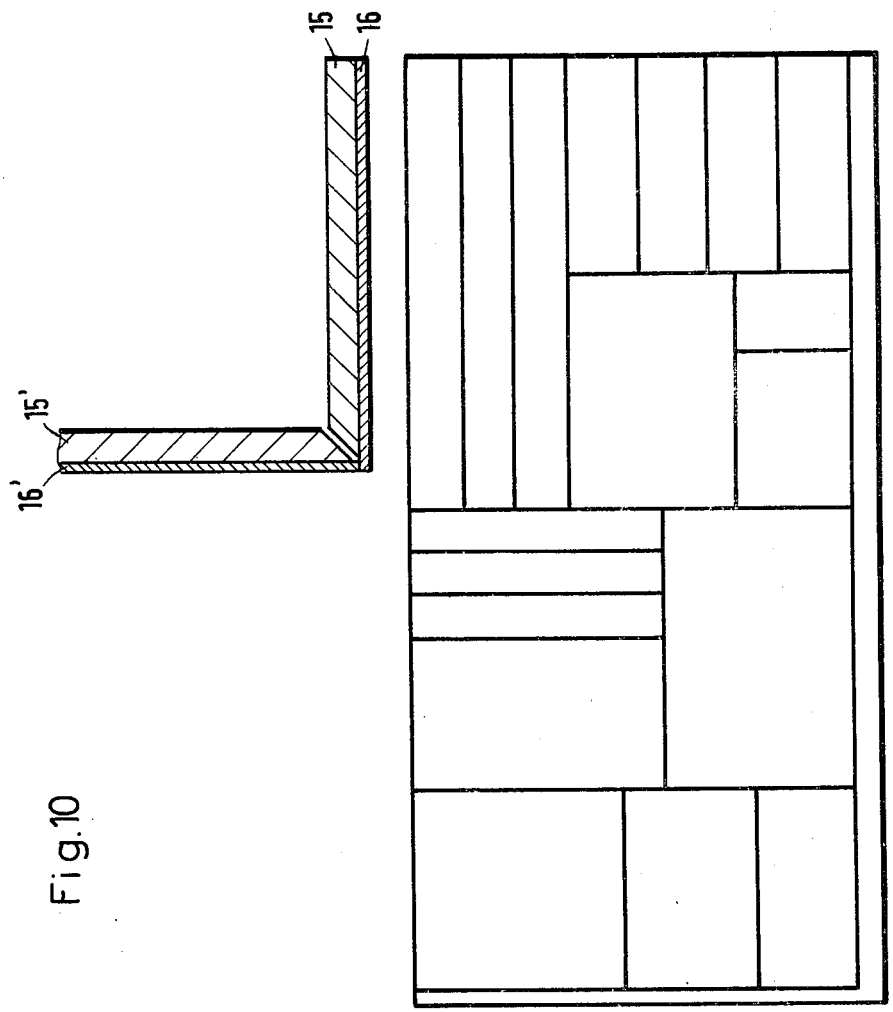
FIG. 10 shows an example for the cutting up of a piece of sheet metal into sections having different sizes.

FIG. 10 shows the possible division of a piece of sheet metal into different pieces with different sizes. FIG. 10 shows the many possibilities of cutting up a piece of sheet metal into separate pieces without it being necessary, in order to avoid, in the case of cuts coming one after the other, cumulative angular errors, to carry out an additional cut for re-establishing the initial coordinate directions. In this case, owing to the arrangement in accordance with the invention of the shear cutting members and their drives, it is possible to perform cuts without interruptions or discontinuities on the cut surfaces, which can be longer than the length of a shear cutting member.

Figure 11:
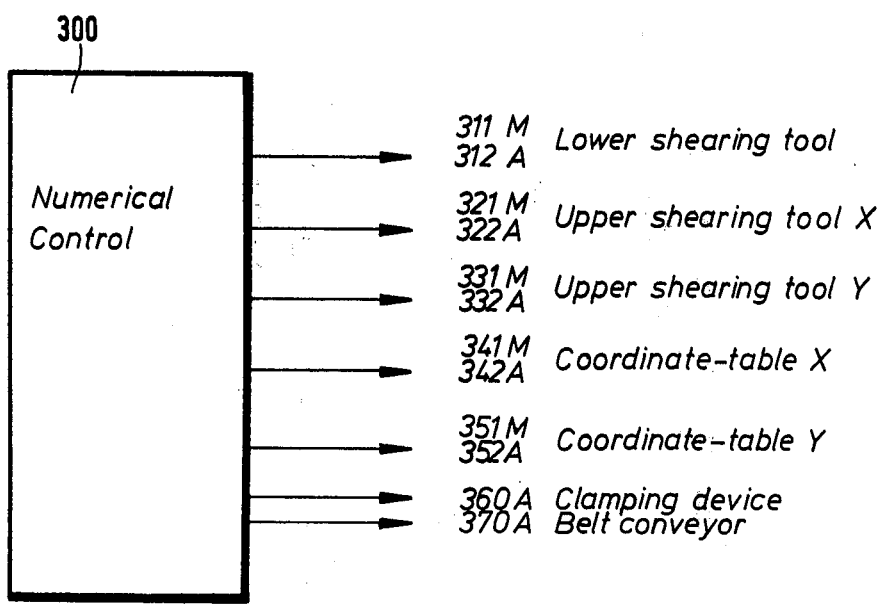
FIG. 11 shows a diagram for the automation of the angle shears by means of numerical control.

FIG. 11 shows the automation of the angle shears by means of a numerical control system. The arrangement in accordance with the invention is made such that the whole of the operations on cutting can be automated. For this purpose, the example shows the use of a numerical control system 300. The numerical control system 300 has an input connection M for the respective functions and an output A. Thus, for example, reference numeral 311 M denotes the connection with the positional measuring system for the lower knives. Reference numeral 312 A denotes the connection for the drive of the lower knives. Reference numeral 321 M denotes a connection for the measuring system of the X shear cutting member. Reference numeral 322 A denotes the drive for the X shear cutting member; lines coming from the tachogenerator and for other purposes are included here. The same applies in the case of reference numeral 331 M for the positional measuring system and reference numeral 332 A for the drive of the Y shear cutting member. Reference numerals 341 M and 342 A denote connections for the positional measuring system drive for the X direction. Reference numerals 351 M and 352 A relate to the Y direction of the co-ordinate table. The connections 360 A serve for driving the holding dogs and other auxiliary means; the connections 370 a serve for controlling the drive of the transport or conveyor belt 3.

In FIG. 11 for the individual parts, there are respective measuring inputs and power inputs shown. In this respect, it is assumed that measuring and driving or setting members are, in fact, constituted by separate parts. In is, however, just as possible to use combined devices as, for example, pulse or stepping motors, in the case of which by a defined length of step, it is possible to ensure that separate measurement in a measuring means becomes superfluous. In this case, the measuring input M and the drive output A are to be considered as one.

Such an integration of an angle shears and a numerical control system makes it possible to achieve automatic operation starting from the point of laying a piece of sheet metal in position, in the case of which more particularly, the multiple division up or cutting up of large pieces of sheet metal into small units has led to extremely rational operation. Spatial automation is, in each case, possible by use of suitable inputs and outputs.

What we claim is:

1. An angle shears for cutting sheet metal and the like including two shear cutting members for cuts in two directions, the shear cutting members having cutting edges, means arranging one shear cutting member in the X-direction and the other shear cutting member in the Y-direction to be capable of moving independently of each other, the cutting edges of the shear cutting members being inclined at small angles to the surface of the sheet metal to be cut, a divided drive for said shear cutting members including threaded spindles operably connected to the shear cutting members whereby rotation of the spindles in one direction moves the shear members in a first direction and rotation of the spindles in a second direction moves the shear members in the opposite direction, and a positional sensor for sensing the vertical position of the shear cutting members.

2. The angle shears in accordance with claim 1 including lower knives respectively cooperating with the two shear cutting members, and adjustment means connected to said lower knives for adjusting the lower knives whereby the cutting gap between the shear cutting members and the lower knives can be adjusted.

3. The angle shears in accordance with claim 2 characterized in that the adjustment means for the lower knives are provided by screw threaded spindles.

4. The angle shears in accordance with claim 3 in which the screw threaded spindles co-operate with ball train nuts.

5. The angle shears in accordance with claim 3 in which an angle transmission connects the screw threaded spindles for the lower knives in the X-direction and the threaded spindles for the lower knives in the Y-direction.

6. The angle shears in accordance with claim 5 characterized in that the lower knives for the X-direction and the lower knives for the Y-direction are guided by means of guide projections in guide grooves and the grooves are arranged at an angle of 45° with respect to the directions of cut X and Y parallel to the plane of cutting.

7. The angle shears in accordance with claim 2 characterized in that the drive for the two lower knives is constructed as a manual drive or a motor drive and the positional measurement for the two lower knives in the X and Y directions is arranged to be carried out by means of a lower knife threaded spindle.

8. The angle shears in accordance with claim 7 characterized in that the position of the shear cutting members in the X and Y directions is determined respectively by a positional sensor, which is mechanically coupled with the ball train threaded spindle.

9. The angle shears in accordance with claim 8 characterized in that as positional sensors single or multi turn potentiometers are provided, in the case of which the wiper position of the potentiometers represents the respective positional actual value.

10. The angle shears in accordance with claim 8 characterized in that as positional sensors use is made of completely digital positional sensors, in the case of which the respective positional actual value is represented by a digital signal.

11. The angle shears in accordance with claim 8 characterized in that as positional sensors use is made of photo-electric or electro-magnetic pulse sensors, in the case of which the respective position can be represented by forward and backward counting of pulses.

12. The angle shears in accordance with claim 8 characterized in that for regulation of the position of the shear cutting members the difference between the positional actual values represented by positional sensors on the shear cutting members in the X and Y directions and pre-established positional target values is employed.

13. The angle shears in accordance with claim 12 characterized in that for stabilizing a regulating circuit for the shear cutting member drive a voltage is employed which is proportional to the speed of rotation of the threaded spindle.

14. The angle in accordance with claim 13 characterized in that the voltage produced for stabilizing the regulating circuit is obtained from a tachogenerator.

15. The angle shears in accordance with claim 12 characterized in that the respective positional target values of the shear cutting members in the X and Y directions can be represented jointly by a program in conjunction with a numerical control system for the angle shears.

* * * * *